United States Patent [19]
Chiu

[11] Patent Number: 5,155,319
[45] Date of Patent: Oct. 13, 1992

[54] HEAT-CONDUCTING FILM FOR ABSORBING ELECTROMAGNETIC WAVE AND MICROWAVE ENERGY

[76] Inventor: Sou-Kuein Chiu, No. 117 Sec. 1, Nei Hu Rd., Taipei City, Taiwan

[21] Appl. No.: 633,111

[22] Filed: Dec. 24, 1990

[51] Int. Cl.$^5$ .................... H05B 6/12; H05B 6/80
[52] U.S. Cl. ................... 219/10.491; 219/10.55 E; 219/10.55 F; 174/35 MS; 428/244
[58] Field of Search ............. 219/10.55 E, 10.55 F, 219/10.55 R, 10.491, 10.493, 10.75; 174/35 MS; 99/DIG. 14, 451; 342/1; 428/242, 244

[56] References Cited

U.S. PATENT DOCUMENTS

| | | | |
|---|---|---|---|
| 4,210,124 | 7/1980 | Husslein et al. | 219/10.55 E |
| 4,933,193 | 6/1990 | Fisher | 426/107 |
| 4,977,302 | 12/1990 | Merigaud et al. | 219/10.55 F |
| 5,002,826 | 3/1991 | Pollart et al. | 428/323 |
| 5,075,526 | 12/1991 | Sklenak et al. | 219/10.55 E |

Primary Examiner—Philip H. Leung

[57] ABSTRACT

A heat-conducting film for absorbing electromagnetic wave and microwave energy comprising: a heat-collecting coat comprising a first paste-like mixture of iron oxide powder, ruthenium, glass powder and medium, the heat-collecting coat adapted to be printed on the surface of a utensil; an electromagnetic wave energy absorbing coat comprising a second paste-like mixture of creaming gold, silver powder and the medium, the electromagnetic wave energy coat being printed on the heat-conducting coat; and a protecting coat comprising a third paste-like mixture of glass powder, the protecting coat being printed on the electromagnetic wave energy absorbing coat so as to protect a utensil from generating static electricity or sparks. So that the utensil can be used for a microwave oven and an electromagnetic wave oven.

1 Claim, 3 Drawing Sheets

HEAT-CONDUCTING FILM FOR ABSORBING ELECTROMAGNETIC WAVE AND MICROWAVE ENERGY

BACKGROUND OF THE INVENTION

1. Field of the Invention

This invention relates to a heat-conducting film, particularly to a film which can be easily coated on a heat-resisting utensil for absorbing electromagnetic wave and microwave energy.

2. Description of the Prior Art

A conventional utensil used for a microwave oven is made of glass, porcelain, or plastics, but it can not be used for an electromagnetic wave oven, because it can not have an electromagnetic induction. Moreover, a conventional utensil used for an electromagnetic wave oven is made of steel, but it can not be used for a microwave oven, because it will have static sparks which may cause great danger. It is very inconvenient to use those conventional utensils without a coated film to absorb both microwave and electromagnetic wave energy.

SUMMARY OF THE INVENTION

A heat-conducting film for absorbing electromagnetic wave and microwave energy consists of a heat-collecting coat, an electromagnetic wave energy absorbing coat, and a protecting coat. The heat-collecting coat consists of Ruthenium, Iron Oxide powder, glass powder, and Medium Oil. These materials are mixed up and milled by a ball miller for five hours to become a paste-like mixture in which they are proportionally dispersed and whose coefficient is adjusted to maintain the same. Said mixture can be pasted and coated on the surface of a fire-resisting utensil. After the coated mixture is dried by a drying machine, it can be burned on the utensil with a flame at a high temperature of 850° C. so as to become a heat-collecting coat whose thickness is 0.03 mm and whose density is 0.005 g/cm2.

Said Medium Oil is comprised of Aromatic Solvent (53%), Synthetic Material (30%), Tetrahydro Naphthalene (7%), Mineral Oil (7%), and Resin Oil (3%). The electromagnetic wave energy absorbing coat consists of said Medium Oil (about 55%), glass powder (about 5%), silver powder (about 37%), and creaming gold (about 3%) which is composed of gold (8%) and Resin Oil (92%). These materials are mixed up to become a paste-like mixture which can be coated on said heat-collecting coat. After the coated mixture is dried, it will become the electromagnetic wave energy absorbing coat whose thickness is 0.09 mm and whose density is 0.02 g/cm2. The gold and silver of the coat are materials good for absorbing wave energy and conducting heat.

The protecting coat is composed of Iron Oxide powder (about 10%) and glass powder (about 90%). The protecting coat can be burned on said wave energy absorbing coat by a flame at a high temperature from 800° C. to 850° C. so as to protect said utensil from generating static electricity and sparks. Thus, the utensil can be used either for a microwave or for an electromagnetic wave oven.

DRAWING REFERENCE NUMERALS

Figure 2:
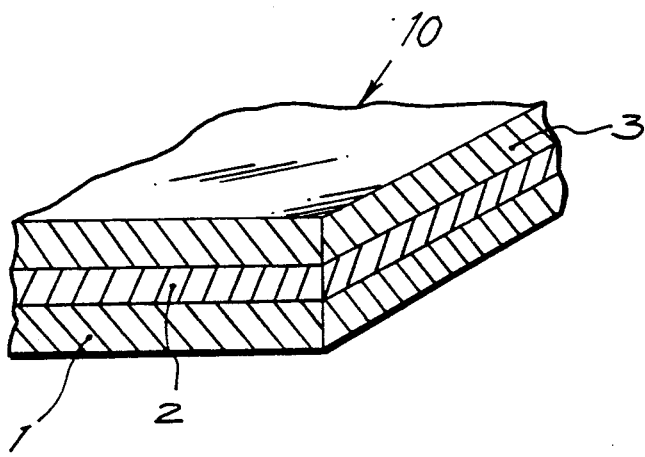
FIG. 2 is a sectional view of the invention.

1 heat-collecting coat
2 electromagnetic wave energy absorbing coat
3 protecting coat
4 surface of heat-resisting utensil
5 electromagnetic wave oven
6 electric cord
7 utensil
8 tray of a roaster
9 electromagnetic wave oscillator
10 heat-conducting film

DETAILED DESCRIPTION OF THE PREFERRED EMBODIMENT

Figure 1:
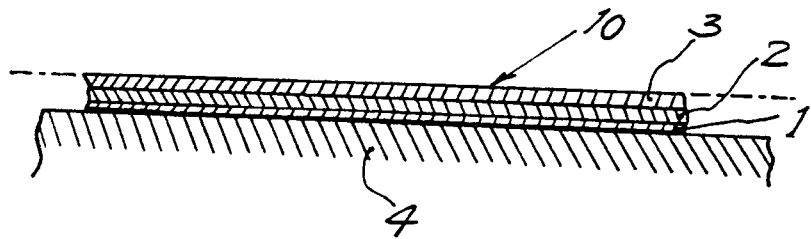
FIG. 1 is a longitudinal sectional view of a film in accordance to the invention.

As shown in FIG. 1 and FIG. 2, a heat-conducting film (10) consists of a heat-collecting coat (1), an electromagnetic wave energy absorbing coat (2), and a protecting coat (3). The heat-collecting coat (1) is comprised of Ruthenium (about 20%), Iron Oxide powder (about 4%), glass sand (about 24%), and Medium (about 52%). These four kinds of materials should be mixed up and milled by a ball miller for about five hours so that they can become a paste-like mixture in which they are proportionally dispersed and whose expansion coefficient is justified to become the same.

Said Ruthenium has a lower expansion coefficient. Iron Oxide powder is made from Iron powder. Pure Iron powder can be burned and forged at a high temperature ranged from 500° C. to 600° C. so as to become Iron Oxide powder which has a good heat conductivity, but has no static induction with microwave. The Iron Oxide powder can conduct heat and can be easily mixed up with other metal, but it will not generate static sparks when it is used in a microwave oven. It also has a good heat conductivity when it is coated on a utensil made of glass or fine ceramic.

The glass powder is an auxillary melting agent which can adjustify the expansion coefficient of the heat-collecting coat (1). The medium contains Aromatic Solvent (53%), Synthetic Material (30%), Tetrahydro Naphthalene (7%), Mineral Oil (7%), and Resin Oil (3%).

Said paste-like mixture can be proportionally printed or pasted as a coat (1) on the surface (4) of a fine ceramic utensil or a glass utensil. The thickness of the coat (1) is about 0.03 mm; the density of it is about 0.005 g/cm2. After it is dried by a drying machine, it is burned on the surface of a utensil at a high temperature of 850° C. The heat-collecting coat (1) can collect the electromagnetic wave and microwave energy (This refers particularly to the ultra short wave of high frequency whose wave length is under 10 m).

The electromagnetic wave energy absorbing coat (2) consists of creaming gold (about 3%) which contains gold (8%) and Resin Oil (92%), silver powder (about 37%), glass powder (about 5%), and said Medium Oil (about 55%) which contains Aromatic Solvent (53%), Synthetic Material (30%), Tetrahydro Naphthalene (7%), Mineral Oil (7%), and Resin Oil (7%). These three kinds of materials are mixed up by a mixing machine with three rollers to become a paste-like mixture.

This mixture is burned on said heat-collecting coat (1) to become an electromagnetic wave energy absorbing coat (2). The thickness of the coat (2) is about 0.09 mm; its density is about 0.02 g/cm2. The energy absorbing coat (2) should be burn on the heat-collecting coat (1) because gold, silver, and iron are easy to absorb electromagnetic wave energy, but they tend to generate static electricty or static sparks, which may cause great danger, when they have induction with microwave.

Figure 3:
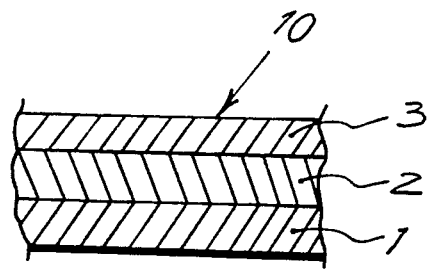
FIG. 3 is a view of the film in operation absorbing elecctromagnetic wave energy according to the invention.

The protecting coat (3) consists of Iron Oxide (10%) and glass sand (90%). It should be burned on the electromagnetic wave energy absorbing coat (2) at a temperature of from 800° C. to 850° C. As shown in FIG. 3, the heat-conducting film (10) contains the heat-collecting coat (1), the electromagnetic wave energy absorbing coating (2), and the protecting coat (3). It can be coated on the surface of a heat-resisting utensil so as to absorb wave energy and transform the wave energy into heat energy. Moreover, it will not generate static electricity and sparks.

Figure 4:
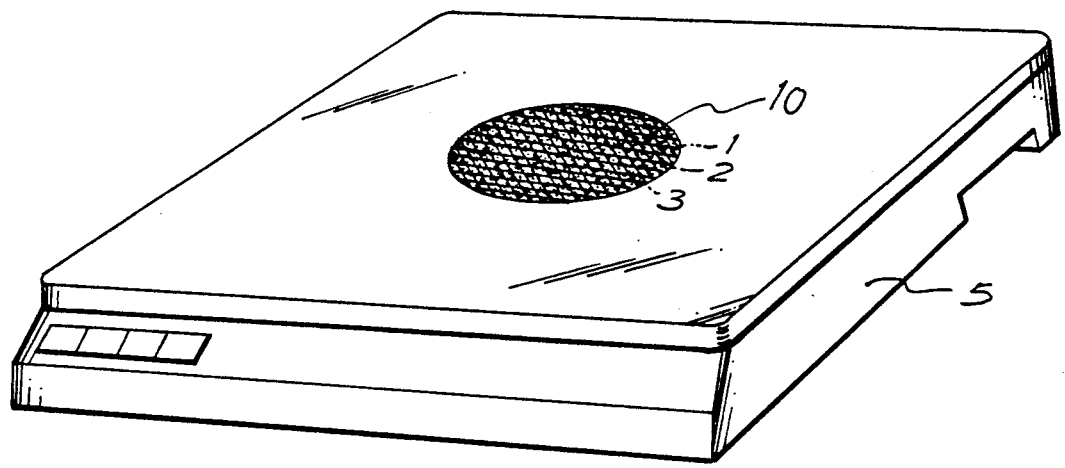
FIG. 4 is a view of the film coated on the surface of an electromagnectic wave oven.

As shown in FIG. 4, the heat-conducting film (10) can be coated on the surface of an electromagnetic wave oven (5) for the heating of a ceramic or glass utensil.

Figure 5:
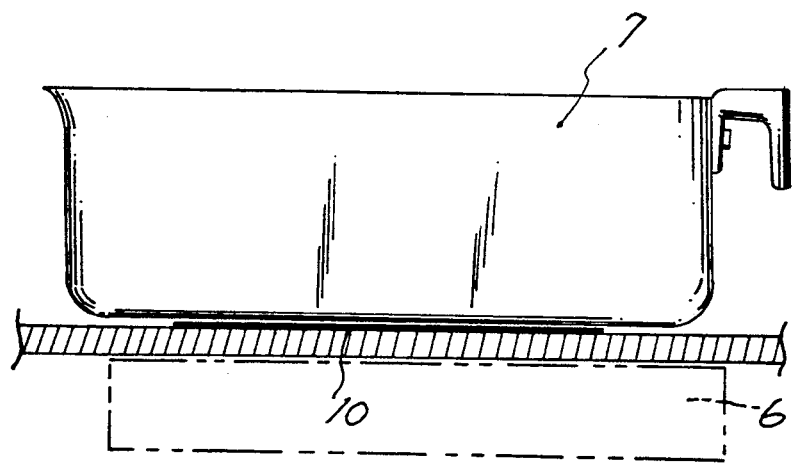
FIG. 5 is a view of the electromagnetic wave oven in FIG. 4 in use heating a utensil.

As shown in FIG. 5, the heat-conducting film (10) can also be coated on the bottom face of a utensil (7) for absorbing the wave energy generated from the electric cord (6) in an electromagnetic wave oven.

Figure 6:
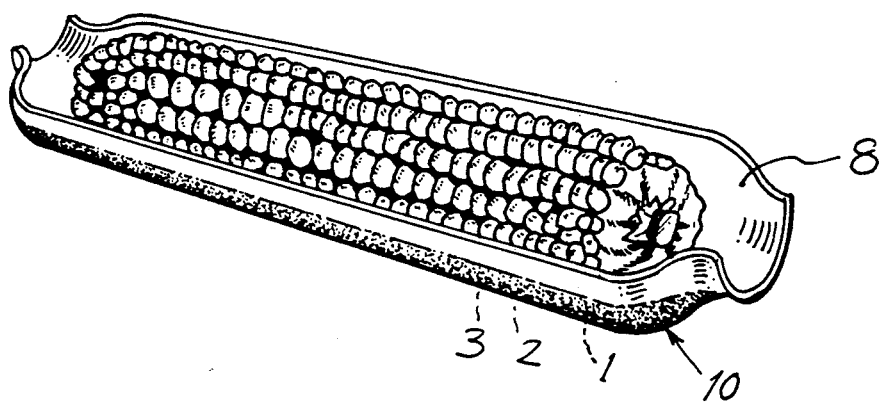
FIG. 6 is a perspective view of the film coated on a tray of a roaster.
Figure 7:
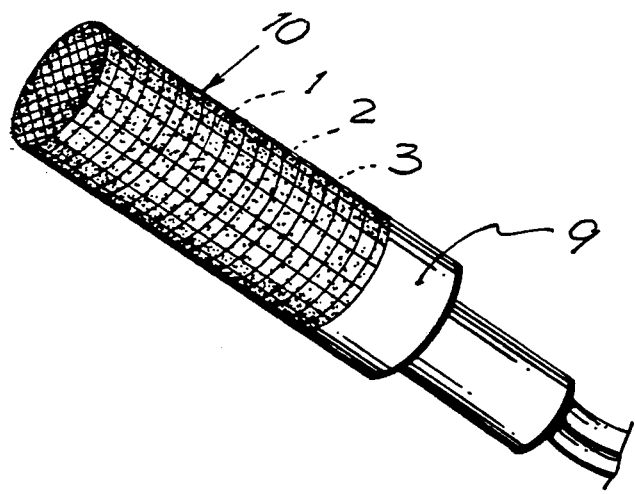
FIG. 7 is a perspective view of the coat printed on the surface of an electromagnetic oscillator used as a heater.

As shown in FIG. 6, it can also be coated on the surface of a tray of a roaster. As shown in FIG. 7, it can also be coated on the surface of an electromagnetic wave oscillator (9).

What is claimed is:

1. A heat-conducting film for absorbing electromagnetic wave and microwave energy comprising:

a heat-collecting coat comprising a first paste-like mixture of about 4% iron oxide powder, about 20% ruthenium, about 24% glass powder and about 52% medium, wherein said medium consisting of 53% aromatic solvent, 30% synthetic material, 7% tetrahydro naphthalene, 7% mineral oil and 3% of resin oil, said heat collecting coat having a thickness of 0.03 mm and a density of 0.005 g/cm$^2$ and adapted to be printed and coated on the surface of a fine ceramic or glass utensil; an electromagnetic wave energy absorbing coat comprising a second paste-like mixture of about 8% creaming gold, silver powder and about 55% said medium, wherein said creaming gold consisting of 8% gold and 92% resin oil, said electromagnetic wave energy coat having a thickness of 0.09 mm and a density of 0.02 g/cm$^2$ and being printed or coated on said heat-collecting coat; and a protecting coat comprising a third paste-like mixture of about 90% glass powder, said protecting coat being coated on said electromagnetic wave energy absorbing coat so as to protect a utensil from generating static electricity or sparks.

* * * * *